(12) United States Patent
Hattori et al.

(10) Patent No.: US 6,409,541 B1
(45) Date of Patent: Jun. 25, 2002

(54) WATERPROOF STRUCTURE IN CABLE INSERTION SECTION, METHOD OF MANUFACTURING THE SAME, AND DIE FOR WATERPROOF MOLDING

(75) Inventors: Yasuhiro Hattori; Hirotaka Yamada, both of Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/984,919

(22) Filed: Oct. 31, 2001

(30) Foreign Application Priority Data

Nov. 2, 2000 (JP) ........................................ 2000-335968
Jan. 19, 2001 (JP) ........................................ 2001-011934

(51) Int. Cl.[7] ................................................ H01R 13/40
(52) U.S. Cl. ........................ 439/587; 439/279; 439/604
(58) Field of Search ................................ 439/587, 588, 439/589, 279, 274, 275, 271, 272, 273, 604, 606; 29/858, 856, 883, DIG. 29, 857

(56) References Cited

U.S. PATENT DOCUMENTS 4,776,813 A 10/1988 Wilson et al.
5,518,415 A 5/1996 Sano

FOREIGN PATENT DOCUMENTS

| EP | 0 407 863 A1 | 1/1991 |
| EP | 0 529 463 B1 | 3/1993 |
| JP | 3-53470 | 3/1991 |
| JP | 6-203903 | 7/1994 |
| JP | 7-73926 | 3/1995 |
| JP | 7-326424 | 12/1995 |
| JP | 8-148219 | 6/1996 |
| JP | 9-106853 | 4/1997 |
| WO | WO 87/05157 | 8/1987 |

*Primary Examiner*—P. Austin Bradley
*Assistant Examiner*—Ross Gushi
(74) *Attorney, Agent, or Firm*—Oliff & Berridge, PLC

(57) ABSTRACT

Connector terminals 13 connected to ends of respective electric wires 12 are inserted into an electric wire insertion section 11b formed in a housing body 11 of a waterproof connector 10. The connector terminals 13 are attached to respective terminal attachment sections 11a. The connector comprises a plug 14 which is molded on the outer peripheral surfaces of the electric wires 12 situated in the electric wire insertion section 11b and which is removably fitted into the electric wire insertion section 11b with a slight gap between the inner peripheral surface of the electric wire insertion section 11b and the plug 14; and a resiliently-deformable annular sealing body 15 which is retained in a retention groove formed along an outer peripheral surface of the plug 14 and which is brought into intimate contact with the inner peripheral surface of the electric wire insertion section 11b.

2 Claims, 10 Drawing Sheets

WATERPROOF STRUCTURE IN CABLE INSERTION SECTION, METHOD OF MANUFACTURING THE SAME, AND DIE FOR WATERPROOF MOLDING

BACKGROUND OF THE INVENTION

1. Field of the Invention

The present invention relates to a waterproof structure in a cable insertion section, that is, a section into which a cable member of the waterproof connector or the like is inserted is waterproofed and to a method of manufacturing the waterproof structure.

The present invention also relates to a waterproof molding die for forming a waterproof mold to be attached to wiring material having lead wires provided therein.

2. Description of the Related Art

In relation to a waterproof connector, an attempt has hitherto been made to block intrusion of liquid into a space defined between an outer peripheral surface of each wire and an inner peripheral surface of a wire insertion hole into which a corresponding wire is to be inserted, by means of attaching a rubber plug to each wire to be assembled (a first related-art example). In another attempt to block intrusion of liquid, there is employed a water proof structure utilizing a plate-like single-piece rubber plug, wherein a plurality of electric wires to be assembled are fitted into a plurality of previously-formed wire conduit sections, thus collectively rendering the electric wires waterproof (a second related-art example). In still another attempt to block intrusion of liquid, there is employed a structure which renders electric wires waterproof by means of filling an electric wire insertion section, into which electric wires are to be inserted, with resin and solidifying the resin (a third related-art example).

For example, FIG. 10 shows structure of a waterproof connector 2 utilizing a single-piece rubber 1. A housing body 3 of the waterproof connector 2 molded from resin has a plurality of terminal attachment sections 3a into which connector terminals 5 connected to conductor terminal sections of electric wires 4, respectively, are to be fitted in an unremovable manner and an electric wire insertion section 3b projectingly formed in a substantially-angular cylindrical shape, situated on one end face side of the terminal attachment sections 3a, and inserted the electric wires 4.

The single-piece rubber 1 is formed from rubber material having a shape of a substantially-rectangular plate and being elastically deformable, the rubber material which is slightly larger than an inner shape of the electric wire insertion section 3b so as to come into closely contact with the inner peripheral surface of the electric wire insertion section 3b when the single-piece rubber 1 is pushed into and fitted to the electric wire insertion section 3b. Wire through holes 1a are formed in the single-piece rubber plug 1 so as to correspond to the terminal attachment sections 3a, respectively, and each electric wire 4 passes through and is held in a corresponding wire through hole 1a.

The waterproof connector is further provided with a holder body 6 for pressing the single-piece rubber plug 1 fitted into the electric wire insertion section 3b from an outside thereof. Similarly, the holder body 6 is formed wire insertion holes 6a through which the connector terminals 5 and the electric wires 4 passes so as to correspond to the connector terminals 5 and the electric wires 4. A latch piece 6b is formed so as to extend from each side edge of the holder body 6. A latch projection 3c formed so as to protrude from an outer peripheral side on either side of the electric wire insertion section 3b is removably latched in a latch hole 6c formed in each latch piece 6b, thereby pressing the outer side surface of the single-piece rubber plug 1 and unremovably hold the plug 1.

However, the waterproof structure of the waterproof connector according to the first related-art example adopts a method of attaching each of rubber plugs to each of electric wires. Because of this, attaching a rubber plug to a wire involves consumption of time during an assembly operation. Further, use of the rubber plugs hinders miniaturization of a waterproof connector associated with miniaturization of a connector terminal.

The waterproof structure according to the second related-art example has a merit of contributing to realization of a compact multi-contact waterproof connector. However, when each electric wire 4 is caused to pass through a corresponding wire through hole 1a of the single-piece rubber plug 1, there is a necessity of first squeezing the connector terminal 5 connected to the electric wire 4. At this time, the connector terminal 5 is squeezed into the wire through hole 1a while holding the electric wire 4. In association with miniaturization of the connector terminal 5, the diameter of the electric wire 4 has become reduced. It is difficult to pass the connector terminals 5 through wire through holes 1 while holding the electric wires 4 due to buckling of the electric wires 4 and the like.

Further, as a result of an increase in the number of contacts in a connector, a task for assembling a connector by means of inserting the connection terminal 5 and the electric wire 4 into a corresponding wire through hole 1a formed in the single-piece rubber plug 1 takes a lot of trouble to be the task difficult. Even when the single-piece rubber plug 1 is used, there is a necessity of a countermeasure for sealing unoccupied wire through holes 1a through use of a dummy plug or film.

The waterproof structure according to the third related-art example obviates a necessity of use of an individual rubber plug to be attached to each electric wire, such as that described in connection with the first related-art example. Further, the waterproof structure according to the third related-art example also obviates a necessity of a task for causing the connector terminal 5 and the electric wire 4 to pass through a corresponding wire through hole 1a formed in the single-piece rubber plug 1, such as that described in connection with the second related-art example. On the other hand, the waterproof structure, however, involves solidification of the wire insertion section by means of filling it with resin. Because of this, upon discovery of an attachment failure having arisen when the connector terminal is attached to the terminal attachment section or upon the connector terminal sustaining damage, the plug can be neither replaced or subjected to maintenance.

SUMMARY OF THE INVENTION

The present invention has been conceived in light of the problems set forth the above and aims at providing a waterproof structure in a cable insertion section in an attempt to improve ease of assembly and maintenance, as well as at providing a method of manufacturing the waterproof structure.

According to a first aspect of the invention, there is provided a waterproof structure in a cable insertion section, wherein an inner peripheral surface of the cable insertion section and an outer peripheral surface of a cable member are sealed together in a cable-inserted state in which connector terminals of cable members connected to ends of individual conductors are inserted into the cable insertion section formed in a housing body and are provided at predetermined positions, the waterproof structure comprising: a plug molded on the outer peripheral surfaces of the cable members situated in the cable insertion section and detachably fitted into the cable insertion section with a slight gap between the inner peripheral surface of the cable insertion section and the plug; and a elastically deformable annular sealing body retained in a retention groove formed along an outer peripheral surface of the plug and brought into close contact with the inner peripheral surface of the cable insertion section.

According to a second aspect of the invention, there is provided the waterproof structure according to the first aspect of the invention, further comprising a holder member having a cable insertion opening smaller than the plug, wherein the holder member having a cable insertion opening smaller than the plug may be detachably engaged with the cable insertion section from an outer surface of the plug while the cable members are inserted into the cable insertion opening.

According to a third aspect of the invention, there is provided a method of manufacturing a waterproof structure in a cable insertion section, wherein an inner peripheral surface of the cable insertion section and an outer peripheral surface of a cable member are sealed together in a cable-inserted state in which connector terminals of cable members connected to ends of individual conductors are inserted into the cable insertion section formed in a housing body and are provided at predetermined positions, the method comprising the steps of: inserting the cable members into a elastically deformable annular sealing body movably to realize the cable-inserted state; detachably fitting a plug into the cable insertion section with a slight gap between the inner peripheral surface of the cable insertion section; molding the plug on the outer peripheral surfaces of the cable members situated in the cable insertion section to form a retention groove for holding the sealing body being in an outer peripheral surface of thereof; and fittingly squeezing the plug into the cable insertion section while the sealing body is retained in the retention groove in the molded plug to bring the sealing body into close contact with the inner peripheral surface of the cable insertion section.

According to a fourth aspect of the invention, there is provided the method of manufacturing a waterproof structure in a cable insertion section according to the third aspect of the invention, further comprising the steps of: inserting the cable members into a cable insertion opening of the holder body having the cable insertion opening smaller than the plug before the step of inserting the cable members into the sealing body; and detachably engaging the holder body with the cable insertion section while the plug is fittingly squeezed into the cable insertion section.

According to a fifth aspect of the invention, there is provided the method of manufacturing the waterproof structure in the cable insertion section according to any one of the third and fourth aspects of the invention, wherein the cable members are a plurality of electric wires; elastically deformable soft elastic members are respectively provided on edges of openings for leading a cable, which are opposed to each other and is situated on either side of two split dies with reference to a longitudinal direction of the electric wires; and molding material is poured into a cavity while the electric wires are put together in a bundle and sandwiched by elastic deformation of the elastic members of the split dies to mold the plug.

According to a sixth aspect of the invention, there is provided A waterproof mold die for molding a waterproof mold having a large-diameter flange section to be attached to a wiring member having lead wires therein and a small-diameter seal section, the waterproof mold die comprising: a die main body having an upper die and a lower die, the dies constituting a molding surface for the flange section of the waterproof mold; and a cylindrical die having single-piece structure, at least a part of the cylindrical die supported by the upper and lower dies of the die main body, wherein a molding surface for the seal section of the waterproof mold is provided in the cylindrical die.

By means of the foregoing structure, when fused insulation material is poured into the molding surface constituted by the die main body and the cylindrical die, there is formed the waterproof mold having the flange section matching the molding surface defined between the upper and lower dies of the die main body and the seal section having the shape matching the molding surface of the cylindrical die, thereby preventing formation of burrs in an outer peripheral surface of the seal section.

According to a seventh aspect of the invention, there is provided the waterproof mold die according to the sixth aspect of the invention, wherein an insertion section for the wiring member is provided in a junction between the upper and lower dies constituting the die main body; and an elastic sealing material is provided in the insertion section.

By means of the structure set forth, while the wiring member remains inserted into the insertion section, fused insulation material is poured into the molding surface constituted by the die main body and the cylindrical die. As a result, the waterproof mold is formed while the waterproof mold is integrally attached to the outer peripheral surface of the wiring member.

According to a eighth aspect of the invention, there is provided the waterproof mold die according to any one of the seventh and eighth aspects of the invention, wherein one end of the cylindrical die is exposed to the outside of the die main body; a retainer die formed of split dies for retaining the wiring member is provided in the exposed portion of the cylindrical die; a surface tapered to a tip is formed on an outer peripheral section of the retainer die; and a mount hole having another tapered surface, which surface becomes wider toward the outside and matches the tapered surface of the retainer die, is formed in the cylindrical die.

By means of the foregoing structure, while the wiring member remains inserted in the insertion section, fused insulation material is poured into the molding surface constituted by the die main body and the cylindrical die. As a result, the waterproof mold is formed while the waterproof mold is integrally attached to the outer peripheral surface of the wiring material. Subsequently, the retainer die is pulled from the mount hole of the cylindrical die, and the split dies are opened, thereby facilitating a task for removing the cylindrical die from the waterproof mold while the upper and lower dies of the die main body remain in an opened state.

DETAILED DESCRIPTION OF THE PREFERRED EMBODIMENTS

[Embodiment 1]

Figure 1:
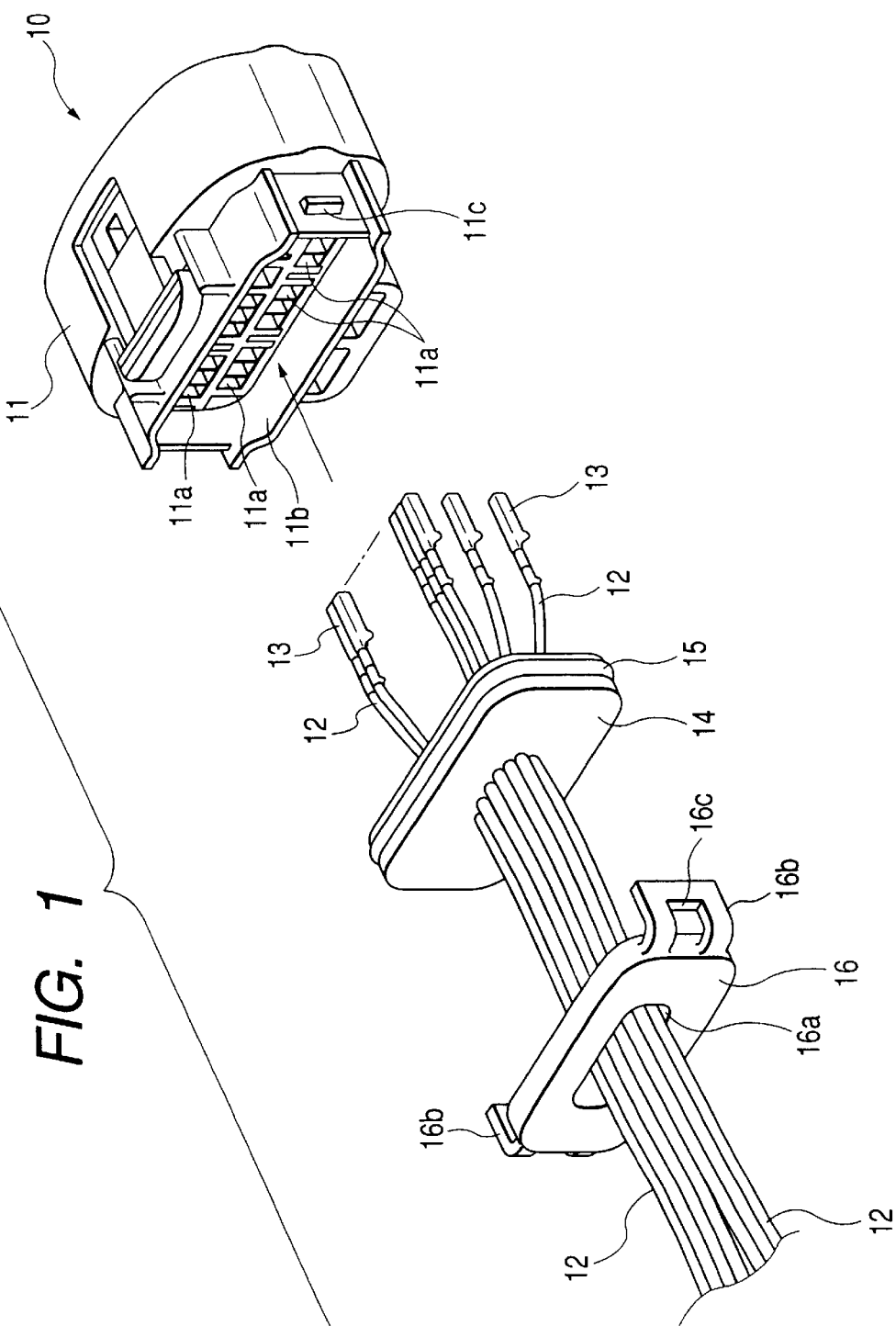
FIG. 1 is an exploded perspective view showing a waterproof structure according to a first embodiment of the present invention.
Figure 2:
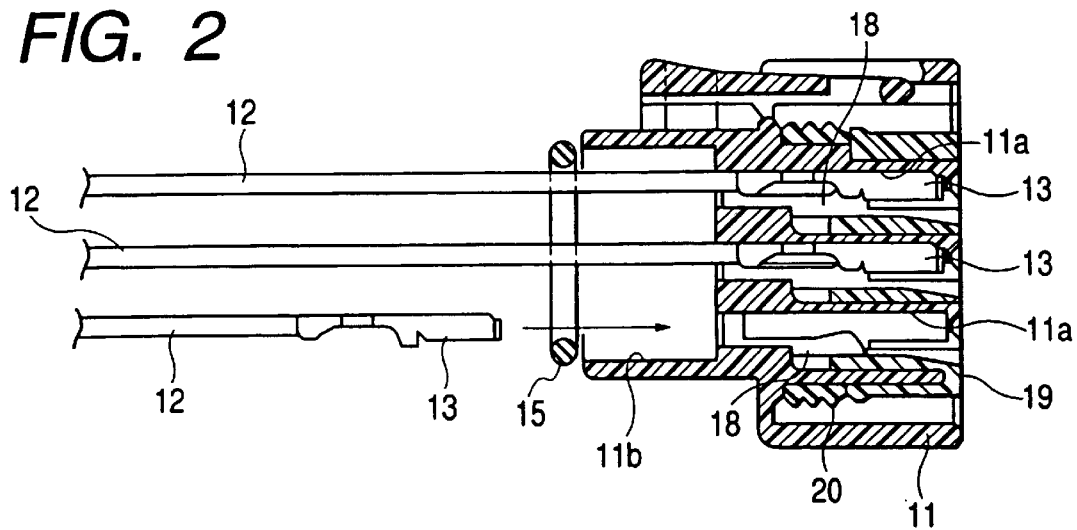
FIG. 2 is an explanatory view showing procedures for manufacturing a waterproof structure.
Figure 3:
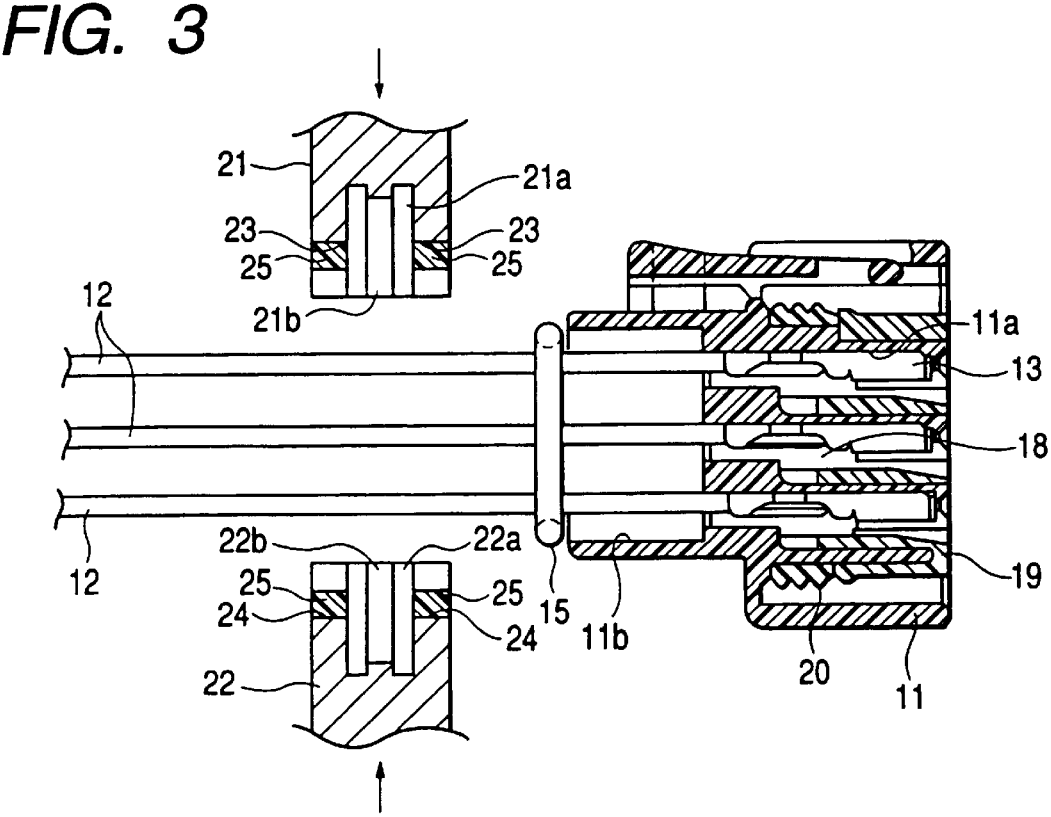
FIG. 3 is an explanatory view showing the procedures for manufacturing a waterproof structure.

A first embodiment of the present invention will be described hereinbelow with reference to drawings. FIG. 1 is an exploded perspective view of a waterproof connector 10. A housing body 11 of the waterproof connector 10 is molded from resin or the like material. A connector terminal 13 is press-fitted to an end of each of electric wires 12 serving as a cable member, whereby the connector terminal 13 is connected to a conductor of the corresponding electric wire 12. A plurality of terminal attachment sections 11a are provided in the housing body 11, wherein each connector terminal 13 is fitted into and prevented from dropping out from a corresponding terminal attachment section 11a. An electric wire insertion section 11b, which serves as a cable insertion section and is projectingly formed in a substantially-angular cylindrical shape, is situated along one end surface side of the terminal attachment sections 11a and enables insertion of respective electric wires 12.

A plug member 14, which has been molded such that the electric wires 12 are put together in a center thereof, is provided in the vicinity of the end of each of electric wires 12. The plug body 14 is formed into a shape of a substantially-rectangular flat plate and is slightly smaller than the electric wire insertion section 11b so as to be removably fitted thereinto with a slight clearance between the plug body 14 and the inner peripheral surface of the electric wire insertion section 11b. The plug body 14 is fixed to the outer peripheral surface of each electric wire 12 in a fluid-tight manner.

Figure 4:
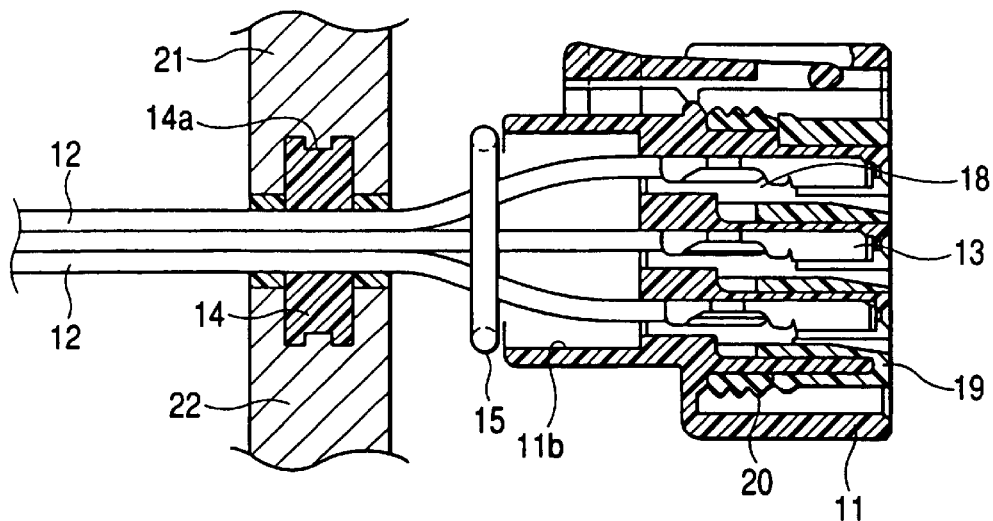
FIG. 4 is an explanatory view showing the procedures for manufacturing a waterproof structure.
Figure 5:
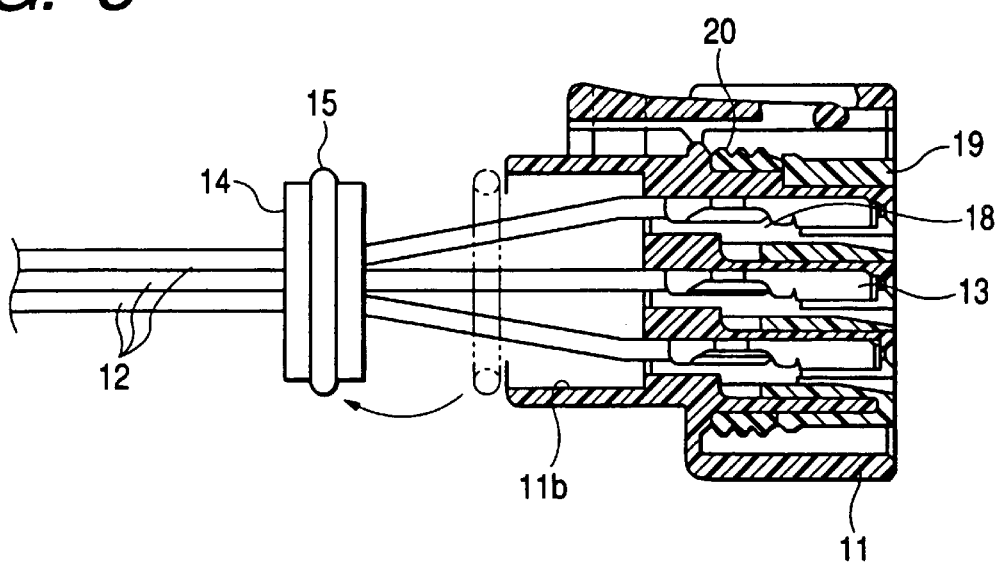
FIG. 5 is an explanatory view showing the procedures for manufacturing a waterproof structure.
Figure 6:
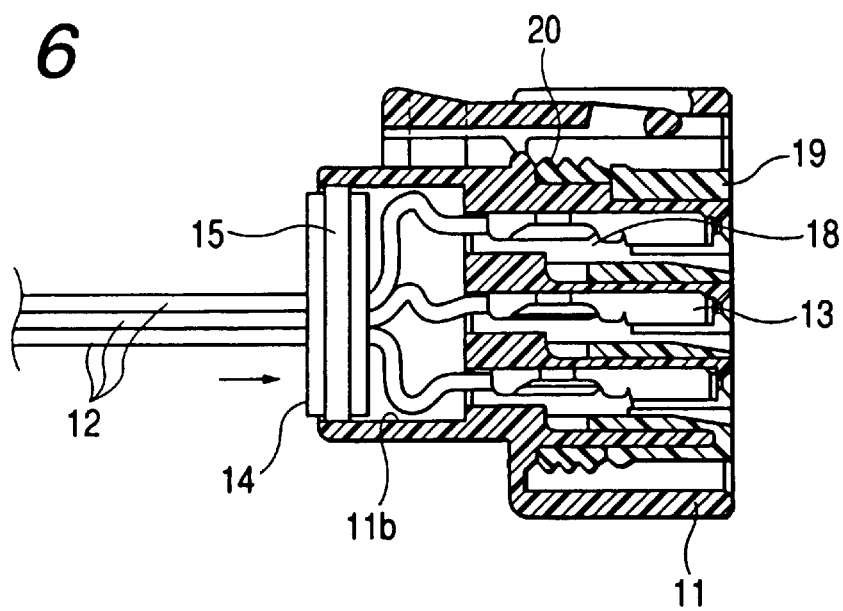
FIG. 6 is an explanatory view showing the procedures for manufacturing a waterproof structure.

A retention groove 14a (see FIG. 4) detachably holding an annular, elastically deformable O-ring 15 is formed along the outer peripheral surface of the plug body 14. When the plug body 14 is fitted into the electric wire insertion section 11b with the O-ring 15 being held in the retention groove 14a, there is achieved a sealed state in which the O-ring 15 closely contacts with the inner peripheral surface of the electric wire insertion section 11a and the outer peripheral surface of the plug body 14 as a result of elastic deformation of the O-ring 15.

The waterproof connector is further provided with a holder body 16 which is molded from resin or the like material and presses the plug body 14 fitted into the electric wire insertion section 11b from the outside thereof. The holder body 16 is formed into a shape of a substantially-rectangular flat plate so as to be removably fitted into the electric wire insertion section 11b. An elongated electric wire insertion opening 16a is formed in a center of the holder body 16 as a cable insertion opening. The electric wire insertion opening 16a is smaller than the plug body 14, and the electric wires 12 are to be loosely inserted into the electric wire insertion opening 16a.

A latch piece section 16b is formed so as to extend from either side edge of the holder body 16. A latch protrusion 11c formed on the outer peripheral surface on either side of the electric wire insertion section 11b is removably latched into a latch hole 16c formed in each latch piece section 16b, thereby pressing the outer surface of the plug body 14 fitted into the electric wire insertion section 11b to hold and prevent from dropping out.

A method of manufacturing the waterproof connector 10 will now be described with reference to FIGS. 2 through 6.

At first, the electric wires 12, the end of each wire having the connector terminal 13 crimped thereon, are caused to pass through the electric wire insertion opening 16a formed in the holder body 16 and through the O-ring 15. Subsequently, each connector terminal 13 is fitted to a predetermined position in the corresponding terminal attachment section 11a via the electric wire insertion section 11b of the housing body 11. At this time, each connector terminal 13 situated in the predetermined position is unremovably latched by a lance 18 provided in the housing body 11 and by a retainer 19 fixed to the housing body 11. Further, the retainer 19 unremovably holds a elastically deformable waterproof ring 20.

After attachment of the connector terminals 13, the electric wires 12 are put together in a bundle and pinched, for example, vertically from both sides thereof in the vicinity of the outside of the electric wire insertion section 11b by means of two split dies 21 and 22. Elastically deformable soft elastic members 25 are provided by an adhesive or the like along edge portions 23, 24 of openings for leading a cable, which are opposed to each other and positioned on both sides of the split dies 21, 22 with reference to a longitudinal direction of the electric wires 12. The elastic members 25 are brought into close contact with the outer peripheral section of the bundled electric wires 12 while the electric wires 12 are put together in a bundle and sandwiched by means of elastic deformation of the elastic members 25.

A cavity 21a defined by the split die 21 and a cavity 22a defined by the split die 22 are filled with a molding member, such as thermosetting resin, thermoplastic resin, or a hot-melt adhesive by way of an unillustrated infusion channel, with the electric wires 12 being sandwiched between the split dies 21 and 22, and the thus-filled molding member is solidified, thereby molding the plug 14. At this time, use of a hot-melt adhesive which obviates a necessity for pre-heating the split dies 21 and 22 is desirable in terms of productivity. For instance, in a case that cladding material of the electric wire 12 is polyvinyl chloride (PVC), dimer-acidbased polyamide is used. In a case where cladding material of the electric wire 12 is polyethylene (PE), an olefin hot-melt adhesive is used.

Protruding fluted sections 21a, 22a are formed in inner surfaces of the split dies 21, 22 in a circumferential direction thereof, respectively. A retention groove 14a is formed along an outer peripheral surface of the plug 14 that has been removed from the cavities 21a and 22a by means of opening the dies.

The O-ring 15 is fittingly retained in the retention groove 14a of the thus-molded plug 14 by means of elastic deformation of the O-ring 15. In the thus-retained state, the plug 14 is fittingly squeezed into the electric wire insertion section 11b. By means of the fitting and squeezing action, the O-ring 15 is elastically deformed. As a result, there is achieved a sealed state in which the O-ring 15 is brought into close contact with the inner peripheral surface of the electric wire insertion section 11b and the outer peripheral surface of the plug 14.

In this state, the holder body 16 is moved to the wire insertion section 11b, thereby causing the latch protrusions 11c to latch the latch holes 16c of the latch pieces 16b, respectively.

As has been described, under the manufacturing method according to the present embodiment, the plug 14 is molded in close contact with the outer peripheral of the electric wires 12 while the wires 12 are put together in a bundle. Hence, there is no necessity for attaching a rubber plug to each electric wire and for causing the connector terminal 5 and the electric wire 4 to pass through the wire through hole 1a of the single-piece rubber plug 1, which have been required in the related art, thereby enabling improvement in ease of assembly. Thus, the manufacturing method is also suitable for realizing a compact multi-contact connector.

The O-ring 15 is fittingly squeezed into the electric wire insertion section 11b while being held in the retention groove 14a of the plug 14. As a result, there can be sealed space between the inner peripheral surface of the electric wire insertion section 11b and the outer peripheral surface of the plug 14. Upon discovery of an attachment failure having arisen when the connector terminal 13 is attached to the terminal attachment section 11a or upon the connector terminal 13 sustaining damage, the plug 14 can be removed from the electric wire insertion section 11b. Therefore, ease of maintenance of the connector after assembly can also be improved.

The soft elastic members 25 are provided at the edges 23, 24 of the openings for leading a cable in the split dies 21, 22. Hence, the elastic members 25 can come into close contact with the outer peripheral surfaces of the electric wires 12, thereby remarkably preventing occurrence of leakage of molding material when the cavities 21a and 22a are filled with molding material.

Further, the holder body 16 can effectively prevent the plug body 14 from detaching from the inside of the electric wire insertion section 11b.

[Embodiment 2]

Figure 7:
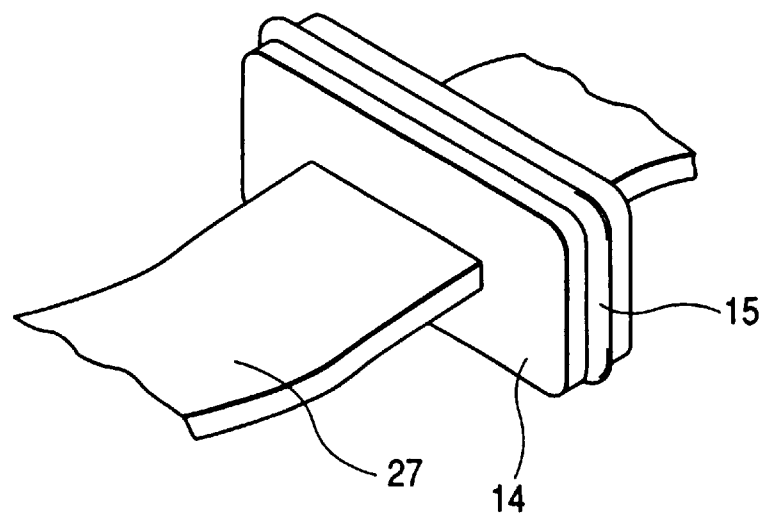
FIG. 7 is a fragmentary perspective view showing a second embodiment of the present invention.
Figure 8:
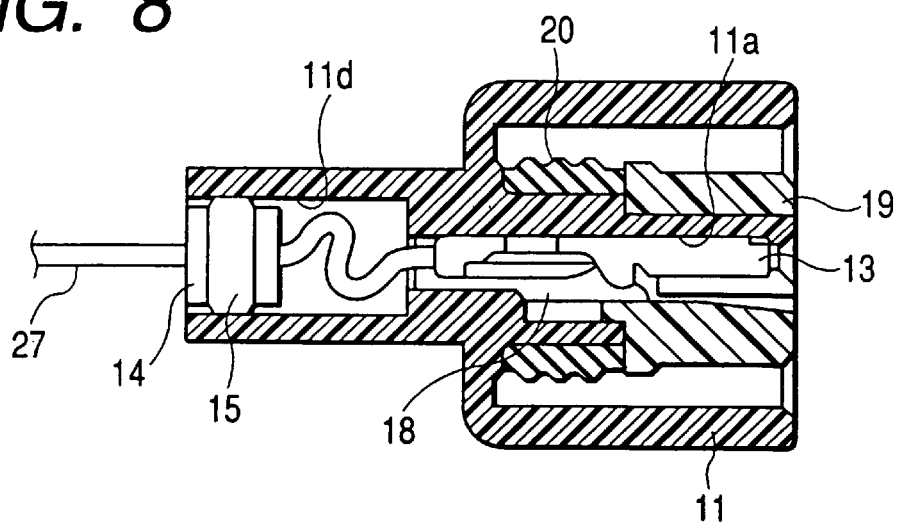
FIG. 8 is a cross-sectional view showing a waterproof structure in an assembled state.

FIGS. 7 and 8 show a second embodiment of the present invention, wherein a flexible flat cable (FFC) 27 is adopted as a cable member. Those constituent elements which are identical with those employed in the embodiment 1 are assigned the same reference numerals, and their repeated explanations are omitted.

Even in the present embodiment, if the plug 14 is molded on the outer peripheral surface of the FFC 27 and if the plug 14 is fittingly squeezed into the cable insertion section 11d in the same manner as mentioned above with the O-ring 15 being held, a sealed state is achieved.

Accordingly, even in the present embodiment, there is yielded the same advantage as that yielded in the first embodiment.

[Embodiment 3]

Figure 9:
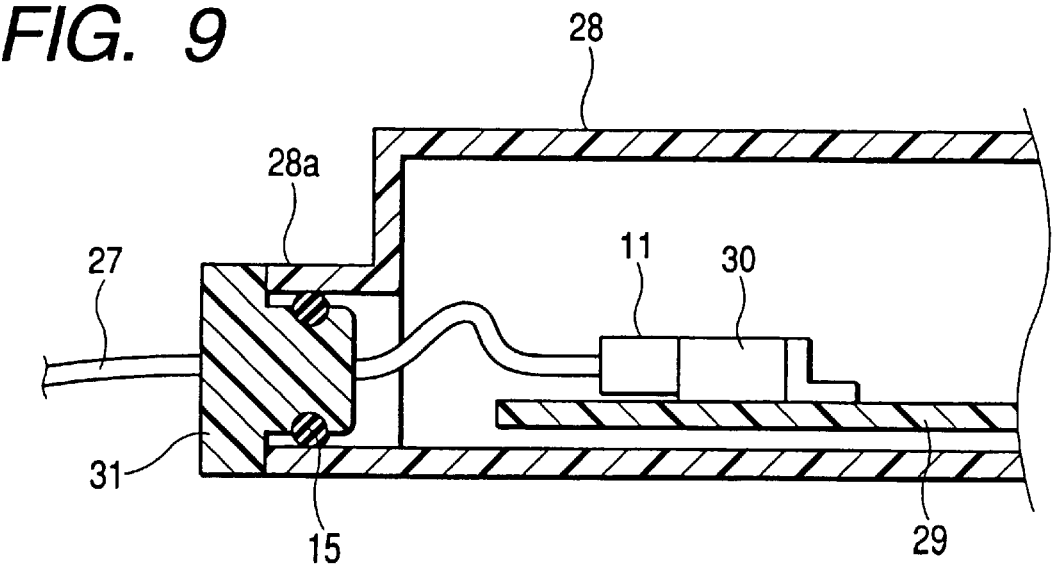
FIG. 9 is a cross-sectional view showing a third embodiment of the present invention and FIG. 10 is an exploded perspective view showing an example related-art waterproof structure.
Figure 10:
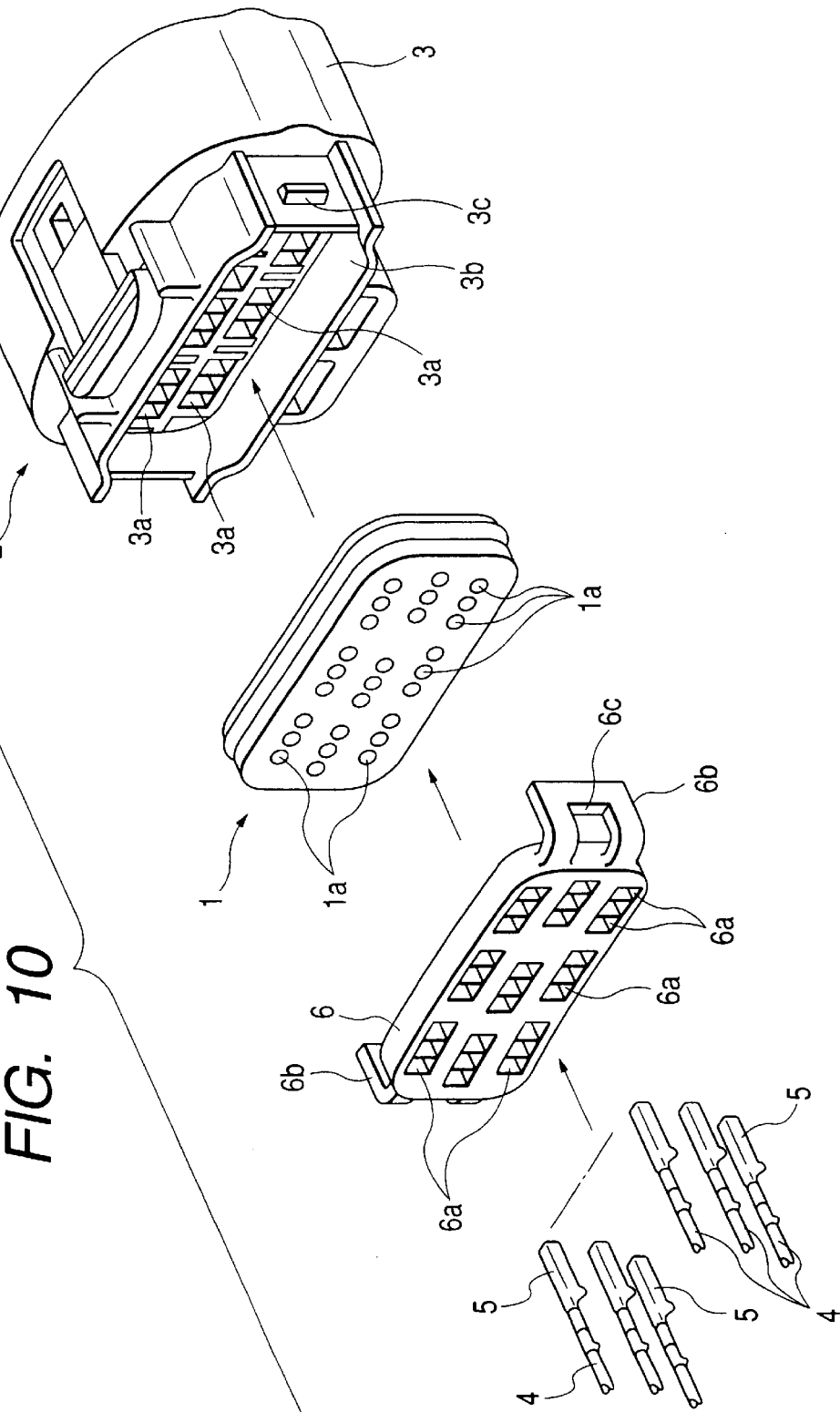

FIG. 9 shows a third embodiment of the present invention, wherein the present invention has been applied to a cable insertion section 28a of a housing body 28 including a case, for example, a unit case such as an ECU or a module case. Those constituent elements which are identical with those employed in the first or second embodiment are assigned the same reference numerals, and their repeated explanations are omitted.

The housing body 11 attached to the FFC 27 is removably connected to a connector section 30 of a substrate 29 housed in the housing body 28. The portion of the FFC 27 inserted into the cable insertion section 28a is molded with a plug 31 in the same manner as mentioned above. The housing body 28 is sealed with the O-ring 15 retained on the plug body 31.

Even in the present embodiment, there is yielded the same advantage as that yielded in the first embodiment.

The above described embodiments show the structures which adopt the plurality of electric wires 12 and the FFC 27 as a cable member. However, a cable member may also be a form of a twist line in which a plurality of electric wires are twisted, a flexible print board (FPC), a ribbon cable, or another sheet-like flat cable. Moreover, there may also be employed a structure having a mix of line materials of multiple types, as in a case of a combination of the electric wires 12 and the FFC 27. In this case, the plug 14 or 31 is molded, and good sealing can be achieved regardless of a cross-sectional profile of a line material.

There has been shown a structure wherein the O-ring 15 is used as a tool ring body. A rubber ring having a plurality of lips, such as a waterproof ring 20, may also be employed.

[Embodiment 4]

Figure 16:
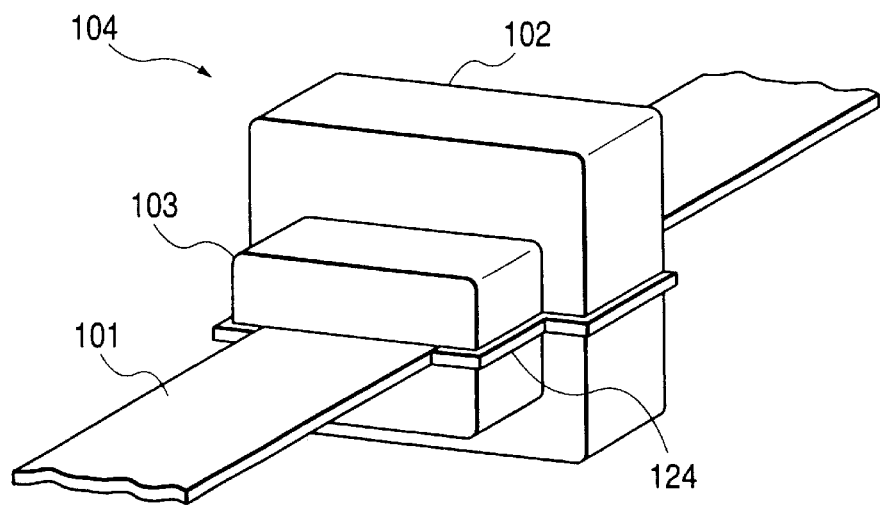
FIG. 16 is a perspective view showing an example of a waterproof mold formed by use of a related-art die.
Figure 17:
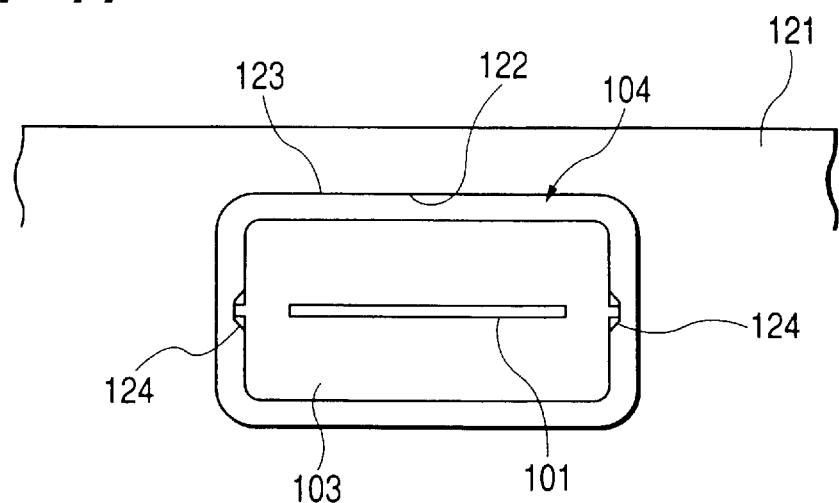
FIG. 17 is a descriptive view showing a mounted state of the waterproof mold and FIG. 18 is a cross-sectional view showing an example of a related-art die.

As shown in FIG. 16, the waterproof mold according to the above embodiments may have a seal section 103 having small diameter to be fitted into an opening or the like area in the partition section, and a flange section 102 having large diameter. As shown in FIG. 17, an O-ring 123 may be provided between the seal section 103 of the waterproof mold 104 and an opening section 122 of the partition section 121, thereby effectively sealing the fitting portion of the seal section 103.

Figure 18:
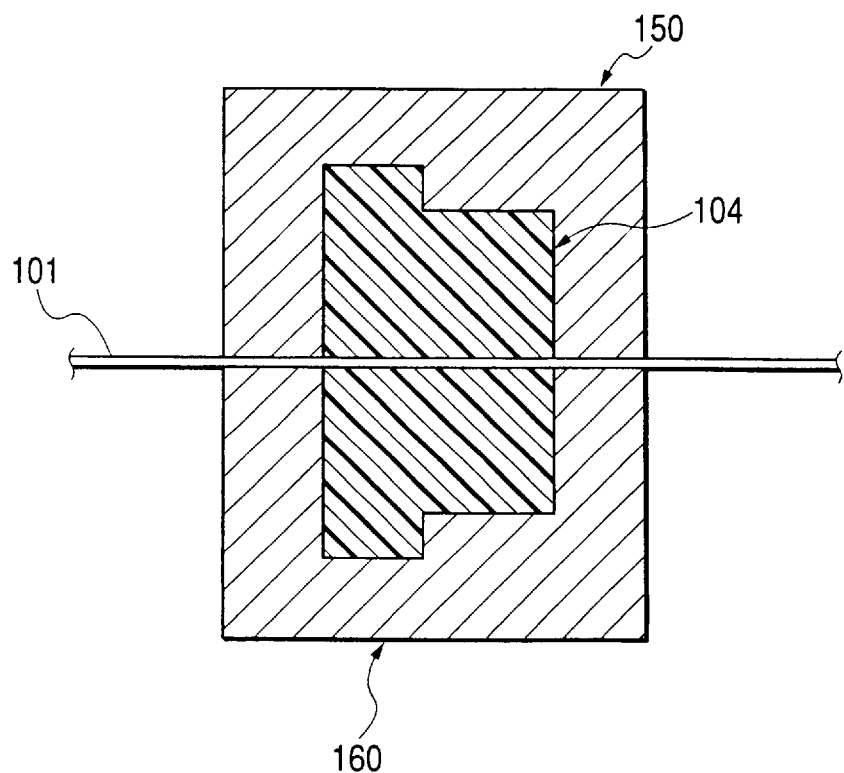

FIG. 18 shows a die for forming the waterproof mold. The die comprises an upper die 150 and a lower die 160 for defining a molding surface matching a shape of a waterproof mold 104. While the upper die 150 and the lower die 160 are clamped, insulating material in a fused state is poured along the molding surface, thereby forming the waterproof mold 104.

As mentioned above, when the waterproof mold 104 is formed by use of the molding die having the upper die 150 and the lower die 160 in the manner as mentioned above, the insulating material poured along the molding surface sometimes leaks from a junction between the upper die 150 and the lower die 160. As shown in FIG. 16, formation of burrs along the outer peripheral surface of the waterproof mold is inevitable. For this reason, as shown in FIG. 17, in case that the seal member including the O-ring 123 is interposed between the seal section 103 of the waterproof mold 104 to be fitted into the opening section 122 of the partition section 121 and the opening section 122, thereby sealing a space between the seal section 103 and the opening section 122, clearance due to presence of the burrs 124 is formed between the seal section 103 of the waterproof mold 104 and the seal member including the O-ring 123, thereby deteriorating a sealing characteristic.

The embodiment 4 has been conceived in light of the above-described drawback and aims at providing a die for forming a waterproof mold capable of preventing occurrence of deterioration of a sealing characteristic due to formation of burrs in an outer peripheral surface of a waterproof mold during formation of the waterproof mold.

Figure 11:
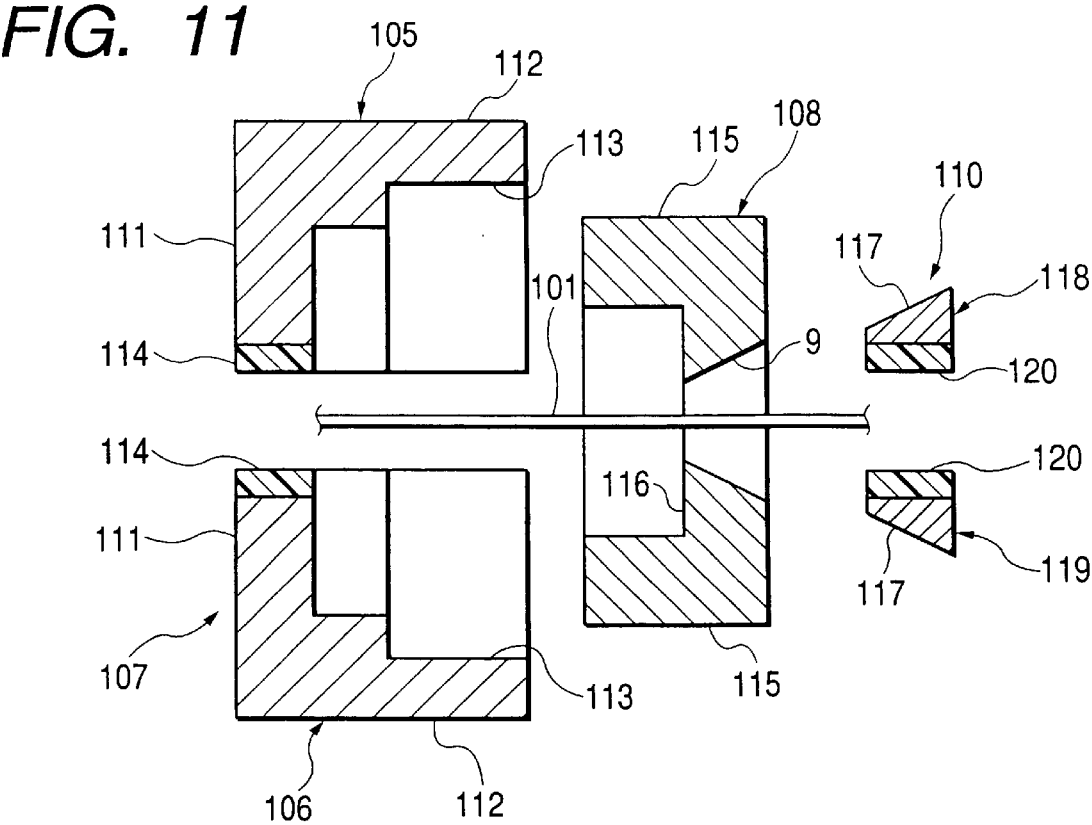
FIG. 11 is a cross-sectional view showing an embodiment of a die for forming a waterproof mold according to the present invention.
Figure 12:
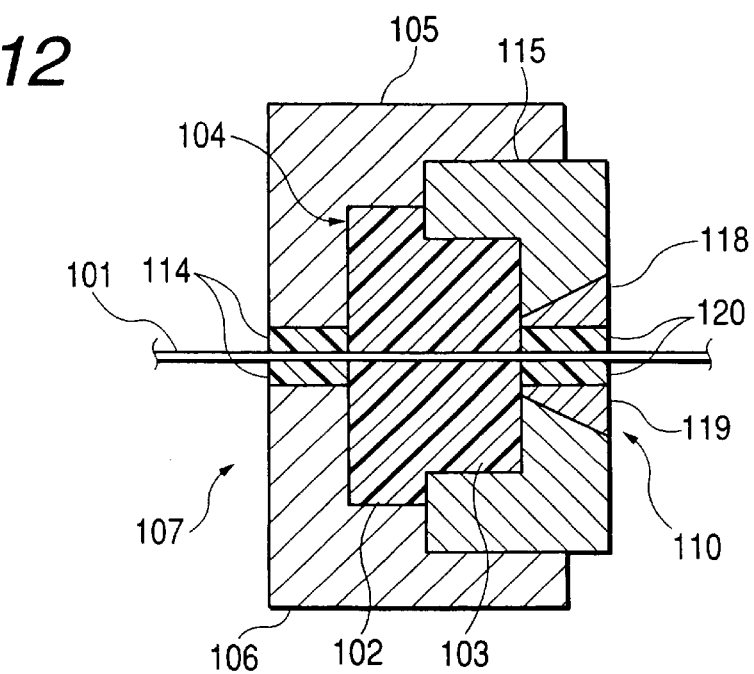
FIG. 12 is a cross-sectional view showing a state in which insulation material is poured into the die.

FIGS. 11 and 12 show a die for forming a waterproof mold according to the embodiment 4. The die is used for forming a waterproof mold 104. The waterproof mold 104 has a flange section 102 of large cross sectional area and a seal section 103 of small cross sectional area (hereinafter an element of large cross-sectional area is referred to as being of "large diameter," and an element of small cross-sectional area is referred to as being of "small diameter."). The water proof molding 104 is att elastic sealing material ached to wiring material 101 including a flat cable having a plurality of lead wires provided therein. The die comprises a die main body 107, a cylindrical die 108, and a retainer die 110. The die main body 107 has an upper die 105 and a lower die 106, which constitute a molding surface for the flange section 102 of the waterproof mold 104. The die 108 has a single-piece structure, and at least a part of the die 108 is retained by the upper and lower dies 105 and 106 of the die main body 107. The retainer die 110 is to be disposed in a mount hole 109 formed in the cylindrical die 108.

Each of the upper and lower dies 105 and 106 of the die main body 107 has an exterior wall section 111 constituting an end face section of the molding surface for the flange section 102, and a large-diameter cylindrical section 112 constituting an outer peripheral section of the molding surface. A step section serving as a retaining section 113 for holding the cylindrical die 108 is formed in the cylindrical section 112. A notch to become an insertion section for the wiring material 101 is formed in the exterior wall section 111 at a junction section between the upper die 105 and the lower die 106. Elastic sealing material 114 made of heat-resisting rubber material or the like is fixed to the insertion section for the wiring material 101, for preventing leakage, to the outside, of fused insulation material poured into the die.

The cylindrical die 108 has a small-diameter cylindrical section 115 and an exterior wall section 116. The cylindrical section 115 constitutes a molding surface for the seal section 103 of the waterproof mold 104, and the exterior wall section 116 constitutes an end face section of the molding surface. The cylindrical section 114 is sandwiched between the upper die 105 and the lower die 106 of the die main body 107, whereby the exterior wall section 116 is retained by the die main body 107 while being exposed to the outside. A mount hole 109 is formed in a center of the exterior wall section 116. The mount hole 109 is tapered so as to become wider toward the outside, and the tapered surface of the mount hole 109 corresponds to a tapered surface 107 formed on an outer peripheral surface of the retainer die 110, the surface 107 being tapered to become narrower toward the tip thereof.

The retainer die 110 has a pair of upper and lower split dies 118 and 119 to be fitted into the mount hole 109. The surface 117 tapered to become narrower toward the tip thereof is formed on the outer peripheral section of the retainer die 110. A notch to become an insertion section for the wiring material 101 is formed in a junction between the split dies 118 and 119. An elastic sealing material 120 made of heat-resistant rubber material or the like is fixed to the insertion section for the wiring material 101 for preventing leakage, to the outside, of fused insulation material poured into the die.

In order to form the waterproof mold 104 through use of the die having the foregoing configuration, the upper and lower dies 105 and 106 of the die main body 107 are closed while the wiring material 101 is inserted into the cylindrical die 108 to retain the cylindrical section 115 of the cylindrical die 108 by the retaining section 113 of the die main body 107 and to clamp the wiring material 101 between the elastic seal members 114 provided in the insertion section of the die main body 107. Subsequently, the split dies 118 and 119 of the retainer die 110 are inserted into the mount hole 109 of the cylindrical die 108 to clamp the wiring material 101 by the elastic sealing materials 120 provided in the insertion section of the retainer die 110.

Figure 13:
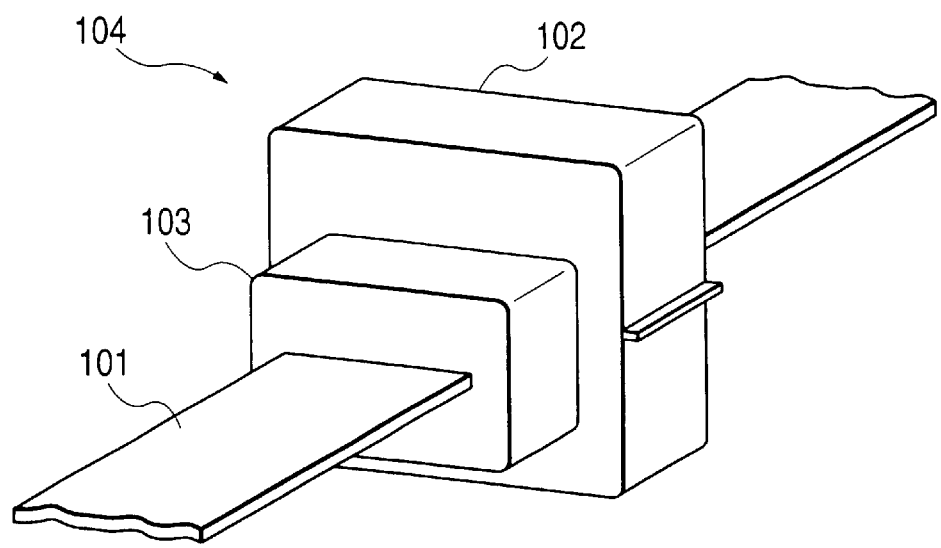
FIG. 13 is a perspective view showing the specific structure of a waterproof mold.

Fused insulation material; for example, liquid silicon rubber, is poured along the molding surface defined by the die main body 107, the cylindrical die 108, and the retainer die 110, and the thus-poured insulation material is solidified. Subsequently, the retainer die 110 is pulled from the mount hole 109 of the cylindrical die 108 to open the split dies 118 and 119. Further, the upper die 105 and the lower die 106 of the die main body 107 are vertically separated to open. Next, the seal section 103 of the waterproof mold 104 formed from the insulation material is removed from the cylindrical die 108. As a result, as shown in FIG. 13, there is eventually formed the waterproof mold 104 having the large-diameter flange section 102 and the small-diameter seal section 103, which are formed integrally so as to cover the wiring material 101.

As mentioned above, there are provided the die main body 107 and the cylindrical die 108 of single-piece structure, wherein the main body 107 comprises the upper die 105 and the lower die 106, which constitute the molding surface for the flange section 102 of the waterproof mold 104 and at least a part of the cylindrical die 108 is retained by the upper die 105 and the lower die 106 of the die main body 107. The molding surface to be used for molding the seal section 103 of the waterproof mold 104 is formed in the cylindrical die 108. As a result, there is not formed a junction surface, which would otherwise be caused by use of a split type die for the molding surface of the cylindrical die 108. Thus, there can be prevented generation of burrs in the outer peripheral surface of the seal section 103 formed by the molding surface of the cylindrical die 108.

Figure 14:
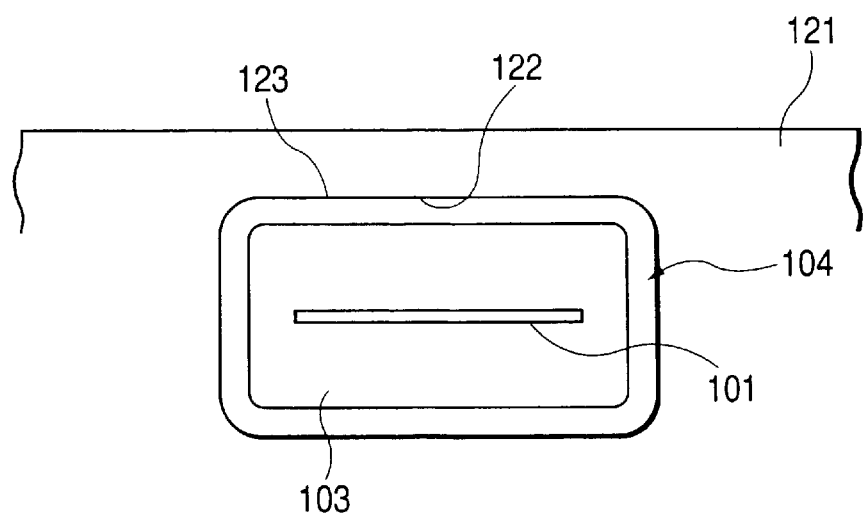
FIG. 14 is a descriptive view showing a mounted state of the waterproof mold.

As shown in FIG. 14, When the wiring material 101 to which the waterproof mold 104 attached is inserted into the partition section 121 and a seal member having the O-ring 123 and the like is disposed between the seal section 103 of the waterproof mold 104 to be fitted into the opening section 122 formed in the partition section 121 and the opening section 122, there is not formed a clearance between the seal section 103 and the O-ring 123 due to presence of burrs. Thus, the insertion section for the wiring material 101 can be sealed without fail by means of the seal member having the O-ring 23 and the like member, thereby effectively preventing intrusion of water into the partition section 121 via the opening 122.

In the embodiment described above, the notch for constituting the insertion section for the flat wiring material 101 is formed in the junction between the upper die 105 and the lower die 106, which constitute the die main body 107. Further, the elastic sealing material 113 is provided in the insertion section. Hence, even when fused insulation material is poured along the molding surface defined by the die main body 107, the cylindrical die 108, and the like while the wiring material 101 remains inserted in the insertion section, the insulation material does not leak from the insertion section of the wiring material 101. Filling the molding surface with the insulation material, the waterproof mold 104 is formed while being integrally attached to the outer peripheral surface of the wiring material 101.

As shown in the embodiment described above, one end of the cylindrical die 108 is exposed to the outside of the die main body 107. The retainer die 110 having the split dies 118 and 119 for retaining the wiring material 101 is provided in the exposed portion of the cylindrical die 107. The surface 117 tapered to become narrower toward the tip is formed on the outer peripheral section of the retainer die 110. Further, the mount hole 109 having a tapered surface matching the tapered surface 117 is formed in the cylindrical die 108. In this case, while the retainer die 110 is disposed in the mount hole 109 of the cylindrical die 108, the upper die 105 and the lower die 106 of the die main body 107 are closed to retain the cylindrical die 108. In this state, fused insulation material is poured along the molding surface, whereby the waterproof mold 104 is formed while being integrally attached to the outer peripheral surface of the wiring material 101.

The retainer die 110 is pulled along the tapered surface formed in the mount hole 109 of the cylindrical die 108 to open the split dies 118 and 119, which constitute the retainer die 110, thereby releasing the wiring material 101 from a retained state. Hence, after the upper and lower dies 105 and 106 of the die main body 107 have been opened, the cylindrical section 115 of the cylindrical die 108 and the seal section 103 of the waterproof mold 104 are separated, thereby facilitating a task for releasing the cylindrical die 108.

In the present embodiment, a slit-shaped notch which is to act as an insertion section for the wiring material 101 is formed in a junction between the split dies 118 and 119 constituting the retainer die 110. Further, the elastic sealing material 120 is provided in the insertion section. Hence, even when fused insulation material is poured along the molding surface defined by the die main body 107, the cylindrical die 108, and the retainer die 110 while the wiring material 101 remains inserted in the insertion section, the insulation material does not leak from the insertion section of the wiring material 101. Filling the molding surface with insulation material, the waterproof mold 104 is formed while being integrally attached to the outer peripheral surface of the wiring material 101.

Figure 15:
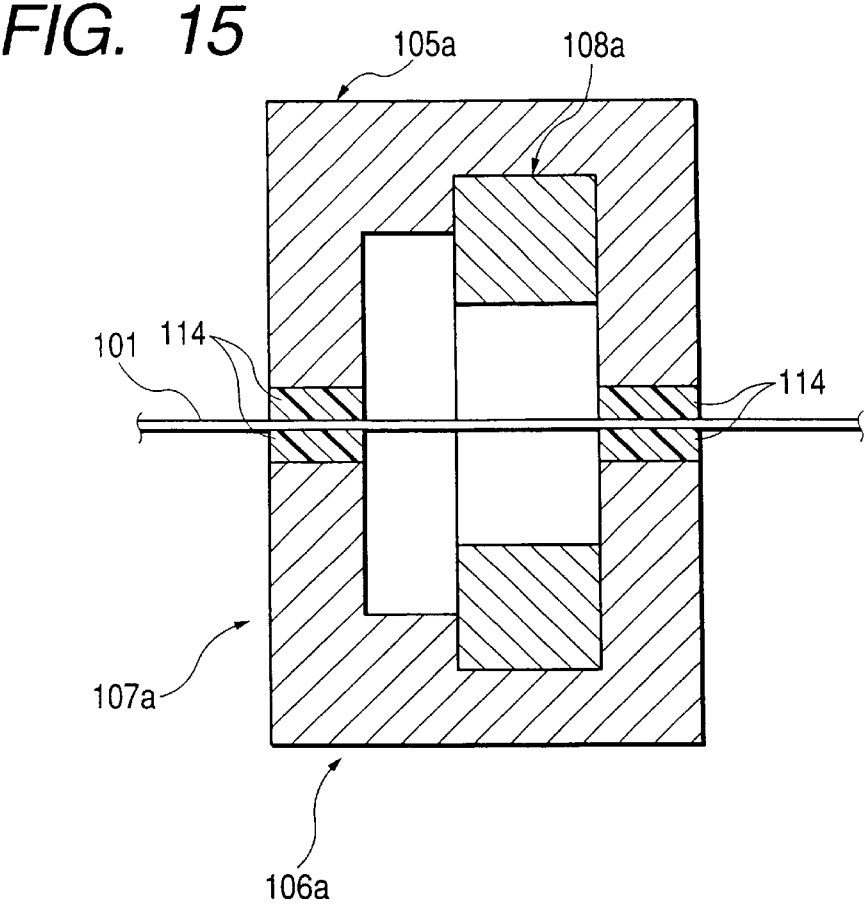
FIG. 15 is a cross-sectional view showing another embodiment of a die for forming a waterproof mold according to the present invention.

In this embodiment described above, the cylindrical section 115 of the cylindrical die 108 is retained by the upper and lower dies 105 and 106 of the die main body 107 and the exterior wall section 115 of the cylindrical die 108 is constituted so as to be exposed to the outside. In stead of the above construction, as shown in FIG. 15, a cylindrical die 108a may be provided in a die main body 107a having an upper die 105a and a lower die 106a so as to cover the entire molding surface for the waterproof mold material 104, and the entirety of the cylindrical die 108a may be retained by the die main body 107a. In this case, it is desirable to form a notch serving as an insertion section for the wiring material 101 in each end of the die main body 107a and to dispose elastic sealing material 114 in the insertion section for preventing occurrence of leakage of insulation material.

As mentioned above, according to the waterproof structure in a cable insertion section and the method of manufacturing the waterproof structure of the present invention, a cable member is loosely inserted into a resiliently-deformable annular seal ring body and sequentially, a plug is molded on an outer peripheral surface of the cable member situated outside the cable insertion section. The plug is removably fitted into the cable insertion section with a slight gap between the inner peripheral surface of the cable insertion section and the plug. A retention groove for holding the seal ring body is formed along an outer peripheral surface of the plug. The plug is fittingly squeezed into the cable insertion section with the seal ring being retained in the retention groove of the molded plug, thereby bringing the sealing ring body into close contact with the inner peripheral surface of the cable insertion section. There is yielded the advantage of improving ease of assembly and ease of maintenance of a connector after assembly.

If the holder body is removably engaged in the cable insertion section while the plug is fittingly squeezed into the cable insertion section, there is yielded an advantage of the ability to effectively prevent removal of the plug from the cable insertion section by means of the holder body.

A resiliently-deformable soft elastic member is provided on the edge of an opening formed in each of two split dies for leading a cable. The elastic member is situated on either side with reference to the longitudinal direction of electric wires, and the elastic members are opposed to each other. Cavities are filled with molding material while electric wires are tied in a bundle and sandwiched by means of resilient deformation of the elastic members of the split dies, thereby molding a plug. As a result, the elastic members are resiliently deformed and are brought into intimate contact with the outer peripheral surface of each electric wire. There is yielded the advantage of the ability to prevent occurrence of leakage of molding material, which would otherwise be caused when the cavities are filled with molding material.

As has been described, the present invention also provides a waterproof mold die for molding a waterproof mold, the mold having a large-diameter flange section to be attached to a wiring material having lead wires provided therein and a small-diameter seal section, the die comprising a die main body formed from an upper die and a lower die, the dies constituting a molding surface for a flange section of the waterproof mold; and a cylindrical die of single-piece structure, at least a part of the die being supported by the upper and lower dies of the die main body, wherein a molding surface for the seal section of the waterproof mold is provided in the cylindrical die, thereby preventing formation of burrs in an outer peripheral section of the seal section, which would otherwise be caused by a molding surface of the cylindrical die.

What is claimed is:

1. A waterproof structure in a cable insertion section, wherein an inner peripheral surface of the cable insertion section and an outer peripheral surface of a cable member are sealed together in a cable-inserted state in which connector terminals of cable members connected to ends of individual conductors are inserted into the cable insertion section formed in a housing body and are provided at predetermined positions, the waterproof structure comprising:

a plug molded on the outer peripheral surfaces of the cable members situated in the cable insertion section and detachably fitted into the cable insertion section with a slight gap between the inner peripheral surface of the cable insertion section and the plug; and a elastically deformable annular sealing body retained in a retention groove formed along an outer peripheral surface of the plug and brought into close contact with the inner peripheral surface of the cable insertion section.

2. The waterproof structure according to claim 1, further comprising a holder member having a cable insertion opening smaller than the plug, wherein the holder member is detachably engaged with the cable insertion section from an outer surface of the plug while the cable members are inserted into the cable insertion opening.

* * * * *